350-96.29
OR 3,625,589

[11] 3,625,589

[72] Inventor Elias Snitzer
Sturbridge, Mass.
[21] Appl. No. 852,977
[22] Filed Aug. 19, 1969
[45] Patented Dec. 7, 1971
[73] Assignee American Optical Corporation
Southbridge, Mass.

[54] APPARATUS FOR CONTROLLING THE PROPAGATION CHARACTERISTICS OF COHERENT LIGHT WITHIN AN OPTICAL FIBER
21 Claims, 11 Drawing Figs.

[52] U.S. Cl .............................. 350/96WG,
350/149, 350/161
[51] Int. Cl ................................. G02b 5/14
[50] Field of Search ........................... 350/96;
96 WG

[56] References Cited
UNITED STATES PATENTS
1,889,852  12/1932  Davis ........................... 350/96 UX
3,031,003  8/1962   Witt ............................. 350/96 X
3,331,651  7/1967   Sterzer ......................... 350/96
3,408,131  10/1968  Kapany ......................... 350/96
3,464,762  9/1969   Kahng .......................... 350/96 UX OTHER REFERENCES
Pollock et al., Optical Processing of Information, Published by Spartan Books, Inc., 1963, pages 61–73, Q327.592. 350–96(WG).

Primary Examiner—John K. Corbin
Attorneys—Nobel S. Williams, William C. Neelon and Robert J. Bird ABSTRACT: A device useful in processing information comprising an optical fiber for transmitting coherent light in a low-order mode of propagation, means for controlling characteristics, including polarity and phase, of the coherent light as it is transmitting through the fiber.

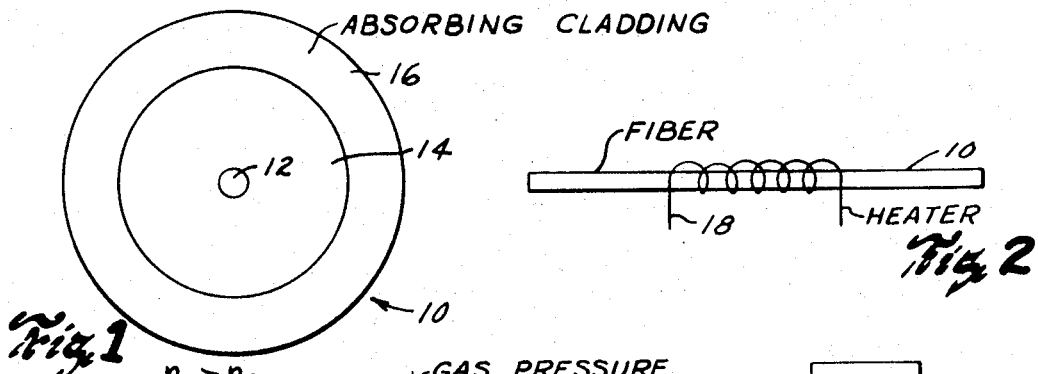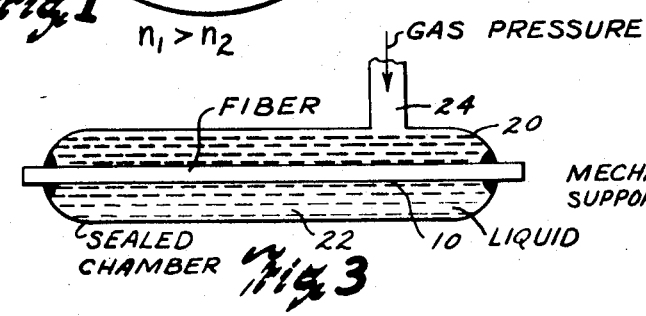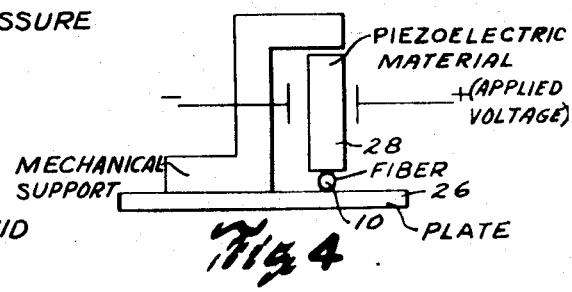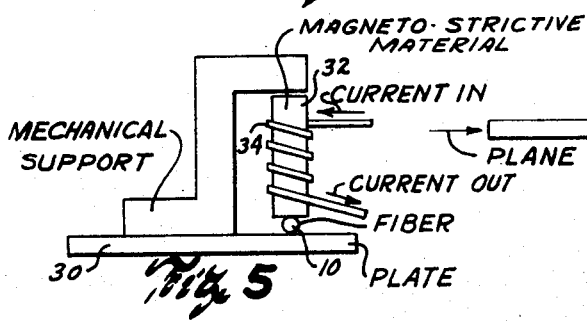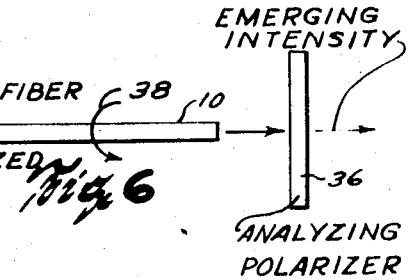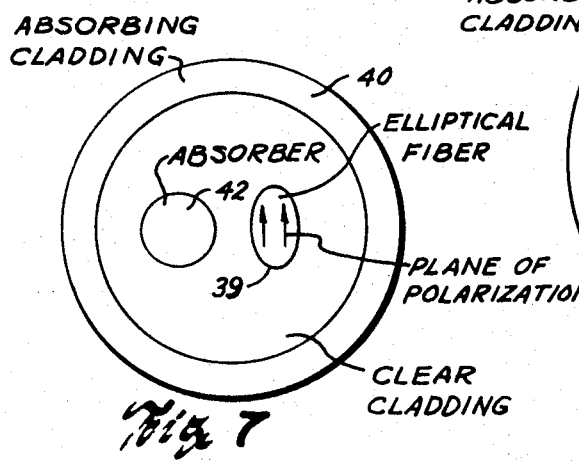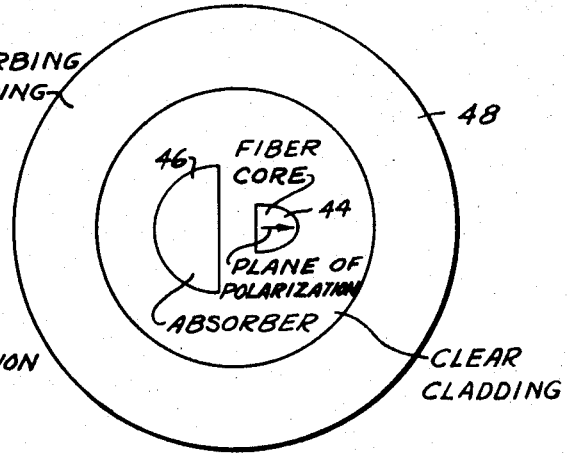

INVENTOR.
ELIAS SNITZER

APPARATUS FOR CONTROLLING THE PROPAGATION CHARACTERISTICS OF COHERENT LIGHT WITHIN AN OPTICAL FIBER

This invention relates primarily to information processors and or particularly to a broad range of analog devices that allows one to made various types of computations including the Fourier transform of a set of signals.

Frequently it is desired while processing a set of oscillatory signals to combine these signals in special ways to produce other sets of data. For example, the Fourier transform can be regarded as a computational step which yields a set of signals from another set. An illustration of the performance of a Fourier transform operation is in an optical system where the amplitude and phase distribution across the back focal plane of an objective is sued effectively as the Fourier transform of the light coming from the object. Obtaining the Fourier transform of a set of complex signals can also be performed with a digital computator, but the computation becomes increasingly difficult as the number of signals being processed becomes large.

Accordingly, a primary object of the present invention is to provide the means by which information may be processed optically.

A further, more specific object is to provide an analog method for preforming computations with optical signals such as obtaining the Fourier transform of a set of signals.

A still further object is to provide an analog method and apparatus for performing computations which are equivalent to taking cross correlations between the signals.

These and other objects are accomplished in an illustrative embodiment of the present invention wherein one or more fibers are provided for the transmission of coherent light. In general, analog computations are performed by using the input signals to control a characteristic (amplitudes and/or phases) of one or a set of coherent point emitters. The transmitted light is altered in amplitude and phase by the application of pressure or temperature and/or other means for affecting the polarization and/or optical path length characteristics of the fiber or fibers, which alteration or affecting is related to the signals desired to be processed.

Other objects, features and embodiments are contemplated and will be apparent in the following detailed description of the present invention by reference to the accompanying drawings, wherein:

FIG. 1 represents the cross section of a fiber useful in the scheme of the present invention;

FIG. 2 represents a scheme by which the temperature of the fiber is changed in response to a given signal in order to affect the optical path length;

FIG. 3 represents a further means for affecting the optical path length of the fiber in response to a give signal by the application of pressure;

FIG. 4 represents a still further means for applying pressure to the fiber in response to a given signal to alter its path length;

FIG. 5 represents a means for affecting the optical path length by an additional means for applying pressure to the fiber;

FIG. 6 represents a means for affecting the amplitude of the optical transmission through the fiber by use of means for altering the polarization characteristics of the light propagated;

FIG. 7 is an alternative scheme to that of FIG. 6 using an elliptical fiber and vertical polarization altering means;

FIG. 8 is a still further variation of the scheme of FIG. 6 wherein the horizontal plane of polarization is altered by using absorbing means to provide a ratio of absorptions for the two planes of polarization;

Figure 10:
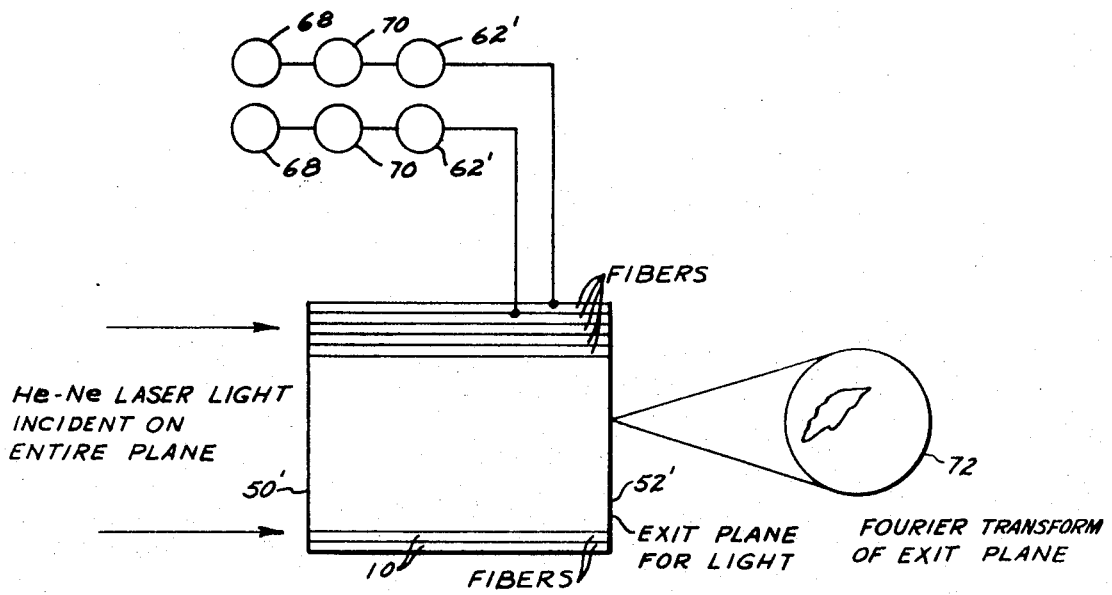
Figure 11:
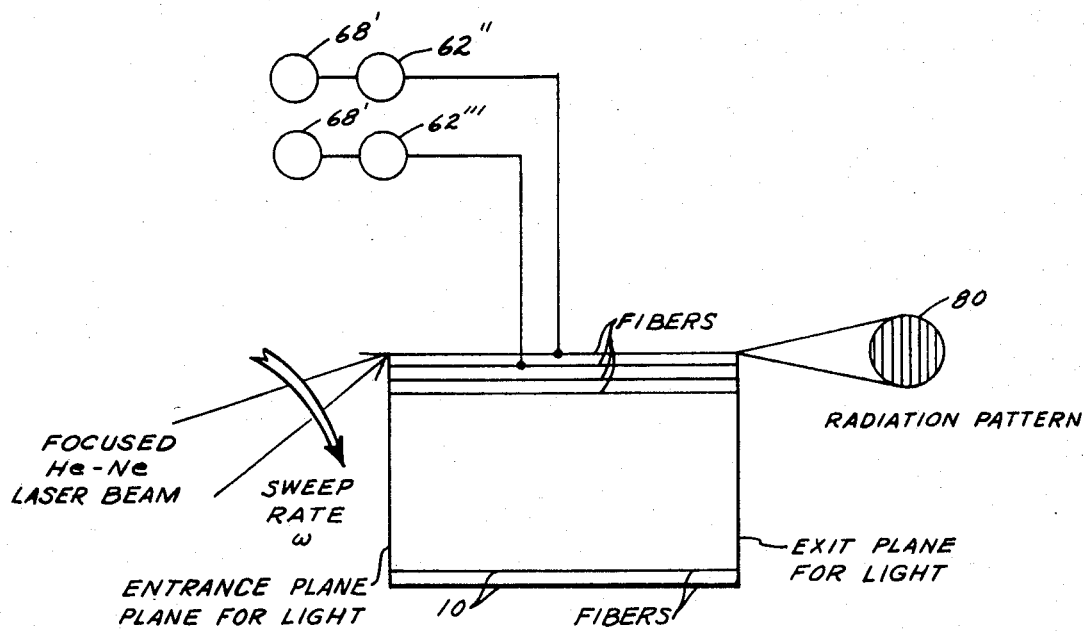

FIG. 10 re presents a schematic for beam forming of monochromatic sonic disturbances as an example of the utility of the present invention; and, FIG. 11 represents a schematic of a beam former for polychromatic disturbances.

It is desirable for obtaining preferred results by use of the present invention to have fibers with cores small enough to support only the few lowest order modes, or preferably the lowest order $HE_{11}$ mode. Also, since in the present invention the far field of the light emerging from the fiber is utilized, it is important that no light be carried by the cladding of the fiber. By reference to FIG. 1, there is shown a fiber 10 in cross section for accomplishing these purposes. A core 12 is surrounded by cladding 14 and by a second cladding 16 with the core used being small enough for desired mode selection. The first cladding 14 could be approximately ten times the diameter of the core and the outer cladding 16 could be about twice as large as the first cladding 14. The function of the outer cladding 16 is to absorb any light propagation along this first cladding. Also, there are conditions in which it may be desirable to have more than one closely spaced core within the first cladding.

FIGS. 2 through 5 show means that are used to change the optical path length for a fiber. Referring first to FIG. 2 there is shown a heater coil 18 wound around a fiber 10. It is known that a temperature change will produce a change in the optical path length. It is possible then to apply the heat selectively by transmission thereto and control by an applied or acquired signals. Another method for changing the optical path length is by stressing the fiber in some way such as the application of hydrostatic pressure as shown in FIG. 3. The sealed pressure chamber 20 is filled with a liquid 22 until the fiber 10 is below the liquid surface. Application of gas or other pressure through an opening 24 in the chamber produces an optical path length change in the fiber 10. These changes in the optical path length are due to a combination of changes in the indices of refraction of core and cladding, a change in the cross section of the core, and a change in length due to Poissons ratio of the glass. The immersion in the liquid of the fiber in FIG. 3 avoids sensitivity to temperature changes of the gas when the compression of the gas is not isothermal. If the fibers are not immersed in the liquid a rapid change in pressure results in a temperature change for the gas, which constitutes a further means for changing the optical path length of the fiber.

A further method for changing the optical path length is shown in FIG. 4 wherein a fiber 10 is compressed between a plate 26 and piezoelectric material 28, which is caused to expand by the application of an electric field. The unidirectional compression transverse to the longitudinal direction of the fiber accomplishes the desired result. A still further method for changing the topical path length is shown in FIG. 5 wherein a fiber 10 is compressed between a plate 30 and a magnetostrictive device 32. Current passing through the coils 34 of the magnetostrictive element expands the element against the fiber to thereby change the optical path length.

It should be understood that the piezoelectric or magnetostrictive materials are also used as integral parts of the fabricated fiber 10. For example, a fiber could be drawn so that a magnetostrictive wire is incorporated within the cladding 14. On the application of a magnetic field the wire changes its dimension to assert a stress on the core thereby changing the optical path length.

All of the foregoing means produce changes in the optical path length in order to change the phase of the light emerging from the exit surface of the fiber. In addition to changing phase it is desirable to change the amplitude of the emerging light in addition or in the alternative.

Several arrangements are presented in FIGS. 6 through 8 for accomplishing changes in amplitude of the fiber 10. One method is to project light of a well-defined polarization, either plane or right circularly polarized, for example, and placing an analyzer 36 at the exit face of the fiber 10 By providing means to change the polarization characteristics of the light propagated down the fiber, the amplitude of the emerging light is changed. For instance, if the fiber is twisted as shown by arrow 38, the plane of polarization will be rotated due to the strains thereby providing optical activity, and the amplitude of the light passing through the analyzing polarizer will be changed. Alternatively, the application of a unidirectional transverse stress to the fiber will produce birefringence, so as to change the amplitude of the light emerging beyond the analyzing polarizer 36.

In the schemes just described with reference to FIG. 6, the amplitude of the transmitted light is changed by absorption in a polarizer external to the fiber. It is possible, alternatively, to selectively absorb one plane of polarization in the fiber itself by a construction such as shown in FIG. 7. There an elliptical core 39, in which the plane of polarization is vertical, for instance is embedded in the same cladding 40 as an absorber 42. If a stress is applied at 45° to the line joining absorber and the core, the resulting birefringence causes a rotation of the plane of polarization. The light which is plane polarized vertically along the major axis of the ellipse does not penetrate as far into the cladding as does light which is polarized horizontally. The net result is to attenuate the horizontally polarized light.

An alternative scheme is shown in FIG. 8 wherein a clear fiber core 44 is embedded in a cladding 48, next to a metal surface 46. The horizontal plane of polarization is absorbed less than for light vertically polarized. By the application of a stress at a 45° angle, the plane of polarization is changed and the light transmission altered. The separation between the core 44 and the metal 46 can be varied so as to permit an optimum ratio of absorption for the two planes of polarization.

It is also contemplated that in addition to the above schemes various forms of fiber entrance excitation and/or exit and selective absorption, including reimaging to get a larger image, may be used for the same or similar purposes.

Figure 9:
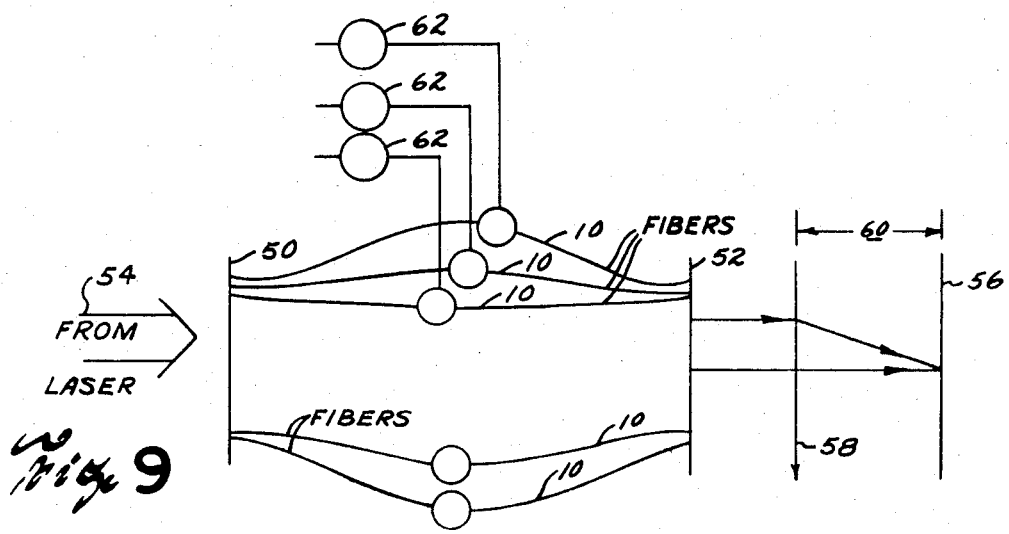
FIG. 9 represents a scheme for obtaining the Fourier transform of an array of phased signals, the phases of the fibers being controlled by the signals applied thereto.

Various computational schemes are made possible by the use of an array of fibers whose optical path length and/or transmitted intensity can be separately varied by appropriate influences, as just described. If coherent light is incident on an array of fibers and the optical path length varied in response to appropriate signals, the light which emerges from the array of fibers is equivalent to an array of dipole emitters whose relative phases are controlled by the signals applied to the fiber. By going to the far field of the exit plane of the fibers, a Fourier transform of the dipole emitters (and thereby a Fourier transform of the array of incident signals) can be obtained. A schematic of such a device is shown in FIG. 9. From plane 50 to plane 52 an array of fibers is provided whose core diameters are small enough to support only the lowest order $HE_{11}$ mode. This mode selection is used, so that light propagates in the fibers at a well-defined phase velocity. The coherent light source, such as a helium-neon laser, illuminates the fibers at plane 50 with light 54. The light which emerges from the fibers at plane 52 is focused on screen 56 by the lens 58 which is at a distance from the screen equal to its focal length 60. The net result is that the intensity distribution of the screen 56 is the Fourier transformer of the distribution at plane 52. As an array of signals is channeled through appropriate transducers 62, phase changes will be produced for the coherent light going through the fibers 10. The production of phase changes is accomplished, for example, by the application of stresses on the fibers which result from the stress-optic effects and changes the optical path length of the fibers. Changes of phase of the light emerging from the fibers then show up in the Fourier transform plane. This scheme can be varied in several ways such as by the application of time varying signals to the fibers, intensity modulating the laser light, illuminating various fibers at different times, or modulating the exit light.

FIG. 10 illustrates a means for beam forming of monochromatic sonic disturbances. In this scheme the signals received by various hydrophones 68 are passed through filters 70 and transducers 62' so hat the various filtered signals relative to an arbitrary phase are measured. The filtering and phase measurement takes place in filters 70 and the transducers 62' produce the same phase displacements as measured for the sonic disturbances on the array of fibers 10 for the laser light propagated therethrough. If a plane wave of laser light is incident on the entrance plane 50' of the fibers 10, the Fourier transform 72 of the emergent light at the exit plane 52' gives directly an image of the source of the sonic disturbances.

One requirement of the scheme of FIG. 10 is that of monochromatic disturbances. FIG. 11 presents a scheme whereby polychromatic disturbances can be processed. The signals from the hydrophones 68' are passed through appropriate transducers 62' and 62''' and applied to optical fibers 10 to produce phase displacements of the laser light passing through the fibers. FIG. 11 shows only those fibers on which phase displacing signals are applied. Each fiber has a companion reference fiber which is unaffected by the applied time-varying signals through he transducers 62'' and 62''' If laser light is focused onto only a one pair of fibers, a the pair consisting of the fiber to which a transduced signal is applied and a companion reference fiber, the result is a radiation pattern 80. If the focused laser beam is scanned to the second fiber of the pair and if the scanning rate is such that when the beam illuminates the second fiber the signal for transducer 62''' is the same on the second fiber as the signal from transducer 62'' was previously when the laser beam was on the first fiber, the radiation pattern does not show any shift in the fringes. By sweeping the beam at various rates across the array of fibers and measuring the contrast ratio from the fringes in the time interval that it takes to sweep the beam, a correlation function is in effect measured, the function corresponding to the intensity of sonic disturbances originating from a given direction. Also, sources of different wavelengths can be scanned simultaneously.

The above schemes or slight variations thereof can be used as a means for simulating an array of dipole emitters, the emitters being the output ends of the fibers.

What is claimed is:

1. An information processor for use with a source of coherent light comprising an optical fiber through which is propagated coherent light from said source, means for producing a signal, and control means responsive to said signal for applying mechanical stress to at least a section of said optical fiber and varying said stress in accordance with said signal to thereby vary a characteristic of said coherent light as said coherent light is propagated through said fiber section, said section being arranged so that the amount of light energy from said source guided by said section from one end of said section to the other throughout the entire length of said section is substantially constant as said mechanical stress is varied.

2. An information processor as recited in claim 1 wherein said control means is operative to vary the phase of the coherent light propagated through said fiber section in accordance with said signal.

3. An information processor as recited in claim 1 wherein said control means is operable to vary the optical path length of said optical fiber section in accordance with said signal.

4. An information processor as recited in claim 1 wherein said control means comprises means for applying pressure to said optical fiber section and varying said pressure in accordance with said signal.

5. An information processor as recited in claim 1 wherein said control means is operable to vary the polarization of the coherent light as it is propagated through said fiber section in accordance with said signal.

6. An information processor as recited in claim 1 wherein said optical fiber is constructed to support only a single dielectric mode of propagation of said coherent light.

7. An information processor as recited in claim 6 wherein said single dielectric mode is the $HE_{11}$ mode.

8. An information processor for use with a source of coherent light comprising a plurality of optical fibers having their entrances arranged in first plane to receive light from said coherent source, a source of signals, and means responsive to said signals to vary the propagation characteristics of at least sections of said fibers in accordance with said signals to thereby vary a characteristic of said coherent light as it is propagated through said fibers, said fiber sections being arranged so that the amount of light energy from said source guided by each of said fiber sections from one end of such section to the other throughout the entire length of such section is maintained substantially constant.

9. An information processor as recited in claim 8 wherein said optical fibers are constructed to support propagation of said coherent light only in the $HE_{11}$ mode.

10. An information processor as recited in claim 8 further comprising a screen, and means for focusing the light emerging from said exits of said fibers on said screen.

11. An information processor as recited in claim 8 wherein there is provided means to scan light from said coherent source across said entrance of said fibers.

12. An information processor for sue with a source of coherent light comprising an optical fiber through which is propagated coherent light from said source, means for producing a time varying signal, control means responsive to said signal to vary the optical path length of said optical fiber in accordance with said signal, said fiber being arranged so that the amount of light energy from said source guided by said fiber from one end of said fiber to the other throughout the entire length of said fiber is substantially constant as the optical path length of said fiber is varied, and reference means for detecting a change in the optical path length of said fiber caused by said signal.

13. An information processor as recited in claim 12 wherein said reference means comprises a second optical fiber propagating light from said source of coherent light, said optical fibers being arranged so that the light propagated through said second optical fiber of said reference means interferes with the light propagated through said first mentioned optical fiber.

14. An information processor for use with a source of coherent light comprising an optical fiber through which is propagated coherent light from said source, means for producing a signal, and stressing means operable to apply compression across the diameter of said optical fiber and to vary the compression applied thereby in accordance with said signal, said fiber being arranged so that the amount of light energy from said source guided by said fiber from one end to the other throughout the entire length of said fiber is substantially constant as the compression across the diameter of said fiber is varied.

15. An information pressor as recited in claim 14 wherein said stressing means comprises a piezoelectric crystal arranged to vary the compression applied across the diameter of said fiber in response to said signal.

16. An information processor as recited in claim 14 wherein said stressing means comprises magnetostrictive material arranged to vary the compression applied across said diameter in response to said signal.

17. An information processor for use with a source of coherent light comprising an optical fiber through which is propagated coherent light from said source, means for producing a signal, and control means responsive to said signal for twisting said fiber to alter the polarization of said coherent light as it is propagated through said fiber in accordance with said signal, said fiber being arranged so that the amount of light energy from said source guided by said fiber from one end of said fiber to the other throughout the entire length of said fiber is substantially constant as the amount of twist applied to said fiber is varied.

18. An information processor as recited in claim 17 wherein said coherent light entering said optical fiber is plane polarized.

19. An information processor as recited in claim 18 further comprising a polarization analyzer positioned to receive the light propagated through said fiber.

20. An information processor for use with a source of coherent light comprising an optical fiber through which is propagated coherent light from said source, means for producing a signal, and a pressure chamber through which said fiber passes, said pressure chamber including means to vary the pressure therein in accordance with said signal, said fiber being arranged so that the amount of energy from said source guided by said fiber from one end of said pressure chamber to the other throughout the entire length of said fiber in said pressure chamber is substantially constant as the pressure in said chamber is varied.

21. An information processor for use with a source of coherent light comprising an optical fiber through which is propagated coherent light from said source, means for producing a signal, and control means responsive to said signal for applying mechanical force to at least a section of said optical fiber and varying said force in accordance with said signal to thereby vary a characteristic of said coherent light as said coherent light is propagated through said fiber section, said section being arranged so that the amount of light energy from said means guided by said section from one end of said section to the other throughout the entire length of said section is substantially constant as said mechanical force is varied.

* * * * *